US006466405B1

(12) United States Patent
Rambosek

(10) Patent No.: US 6,466,405 B1
(45) Date of Patent: Oct. 15, 2002

(54) DATA STORAGE CARTRIDGE WITH READ/WRITE SELECTOR SWITCH

(75) Inventor: G. Phillip Rambosek, Shafer, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/475,939

(22) Filed: Dec. 30, 1999

(51) Int. Cl.[7] .................... G11B 23/027; G11B 23/28
(52) U.S. Cl. ................................. 360/132; 360/133
(58) Field of Search ............................ 360/132, 133; 369/291

(56) References Cited

U.S. PATENT DOCUMENTS

| 4,460,930 A | 7/1984 | Takahashi |
| 4,536,812 A | 8/1985 | Oishi et al. |
| 4,805,061 A | 2/1989 | Champagne et al. |
| 5,041,923 A | 8/1991 | Iwata et al. |
| RE33,961 E | 6/1992 | Swinburne et al. |
| 5,121,279 A | 6/1992 | Saeki et al. |
| 5,239,437 A | 8/1993 | Hoge et al. |
| 5,272,693 A | 12/1993 | Fujisawa |
| 5,331,499 A | 7/1994 | Marcusen |
| 5,367,422 A | 11/1994 | Fujisawa et al. |
| 5,371,644 A | 12/1994 | Hoge et al. |
| D369,791 S | 5/1996 | Wulfing et al. |
| 5,748,419 A | 5/1998 | Langseth et al. |

FOREIGN PATENT DOCUMENTS

| EP | 0 327 008 | 8/1989 | |
| EP | 0 389 121 | 9/1990 | |
| EP | 0 529 270 | 3/1993 | |
| EP | 0 533 463 | 3/1993 | |
| EP | 0 376 570 | 3/1994 | |
| EP | 0 924 703 | 6/1999 | |
| JP | 5-198138 | * 8/1993 | |
| JP | 07296558 A | * 11/1995 | ........... G11B/19/04 |

* cited by examiner

Primary Examiner—William Klimowicz
(74) Attorney, Agent, or Firm—Eric D. Levinson

(57) ABSTRACT

A data storage cartridge (10) includes a switch (50). The switch (50) has a handle (56) that extends through an opening (30) and the switch (50) has a sensor member (55) which extends in a second opening (40). The switch (50) is held in position with a spring positioning post pin (42).

3 Claims, 6 Drawing Sheets

DATA STORAGE CARTRIDGE WITH READ/WRITE SELECTOR SWITCH

BACKGROUND OF THE INVENTIION

This invention relates generally to a data storage tape cartridge and more particularly to a data storage tape cartridge having a read/write selector switch.

Cartridges have been used for decades in the computer, audio and video fields. The data storage tape cartridge continues to be an extremely popular form for recording large volumes of information for subsequent retrieval and use. The data storage tape cartridge usually includes a read/write switch. The switch will determine whether or not the tape can only be read or if the tape can also be written on. A probe or other similar sensors is utilized to determine the position of the switch and thereafter control whether or not the tape can only be read or if it can also be written on. The switch is operated by the user and is movable between a first and second position.

While the above-noted use of a read/write switch is universally accepted, certain potential problems have been identified. For example, the switches will often include many components which need to be assembled, which thereby necessitates increased costs and production problems. To remain competitive, data storage tape cartridge manufacturers must continually improve cartridge performance while reducing manufacturing costs. To this end, the typical read/write switch does not provide for a low cost, easy-to-assemble switch.

SUMMARY OF THE INVENTION

In one embodiment, the invention is a data storage cartridge having a housing with first and second sections. The sections are operatively connected to form the housing. The housing defines the first opening and a second opening. A switch, having a first plate having a first surface and a second surface is provided. The first surface is proximate the housing. The second plate is operatively connected to the first plate and extends away from the first plate. The second plate has a side having first and second positioning members. A spring positioning pin is operatively connected to the housing, wherein the switch is slidable between a first position and a second position and the pin interacts with the positioning member to positively locate the switch in position.

In another embodiment, the invention is a data storage cartridge having a housing with first and second sections. The sections are operatively connected to form the housing. The housing defines a first opening and a second opening. A drop-in switch has a handle proximate the first opening and a sensor member proximate the second opening. The switch has a plate having a first and second surface. The switch further has first and second positioning members. A retainer is operatively connected to the housing. The plate is positioned between the retainer and the housing. A spring pin is operatively connected to the housing, wherein the spring pin contacts the positioning members of the switch for positive location of the switch.

In another embodiment, the invention is a data storage cartridge having a housing having a first section and a second section, the sections operatively connected to form the housing. A housing defines a first opening and a second opening. A switch has a handle proximate the first opening and a sensor member proximate the second opening. The sensor member has a sensor surface with a square cross-section and the second opening has a rectangular shape, the rectangular shape being substantially twice the size of the cross-sectional area of the sensor member.

DETAILED DESCRIPTION OF THE PREFERRED EMBODIMENT

Figure 1:
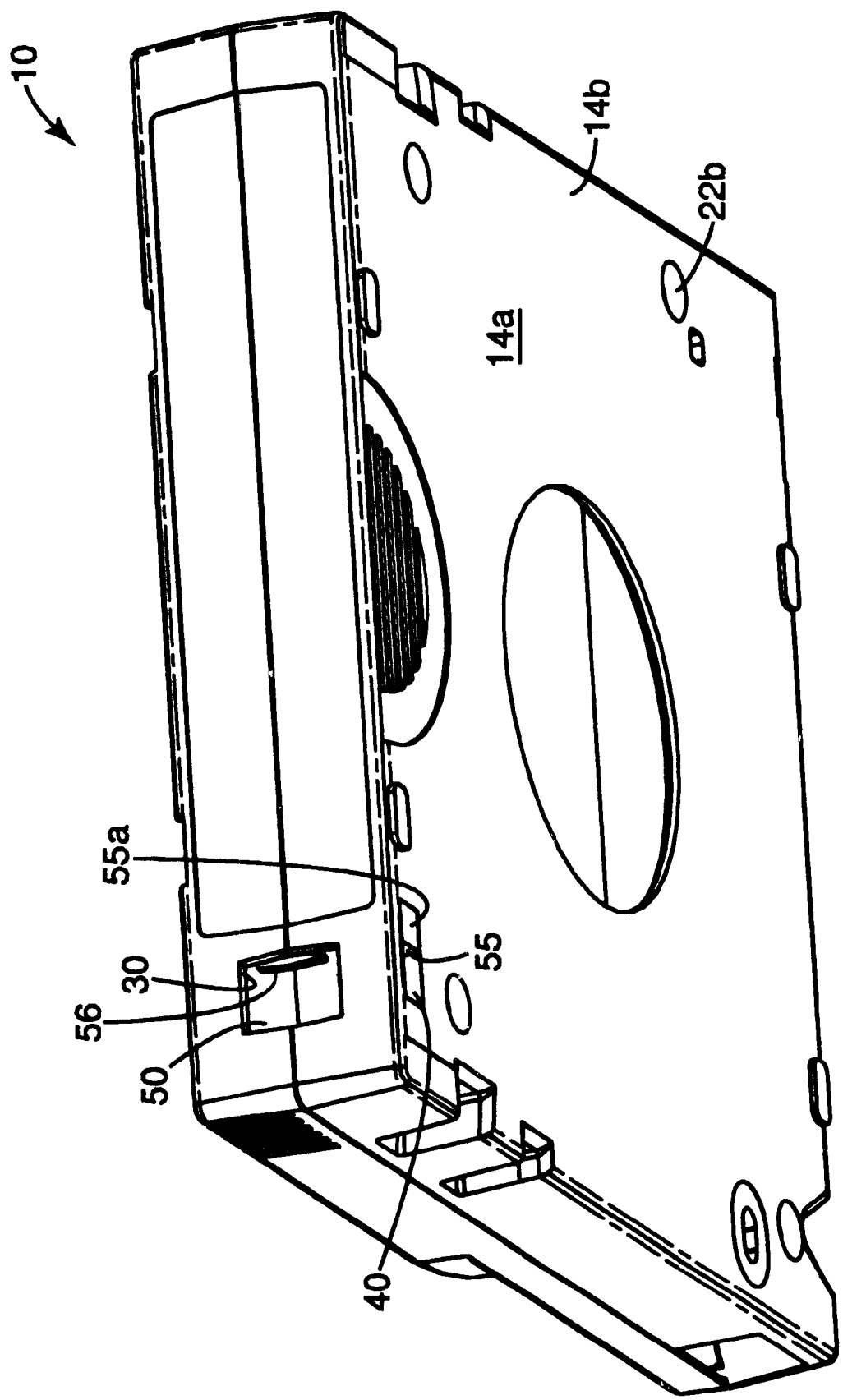
FIG. 1 is a perspective view of a data storage tape cartridge in accordance with the present invention.
Figure 2:
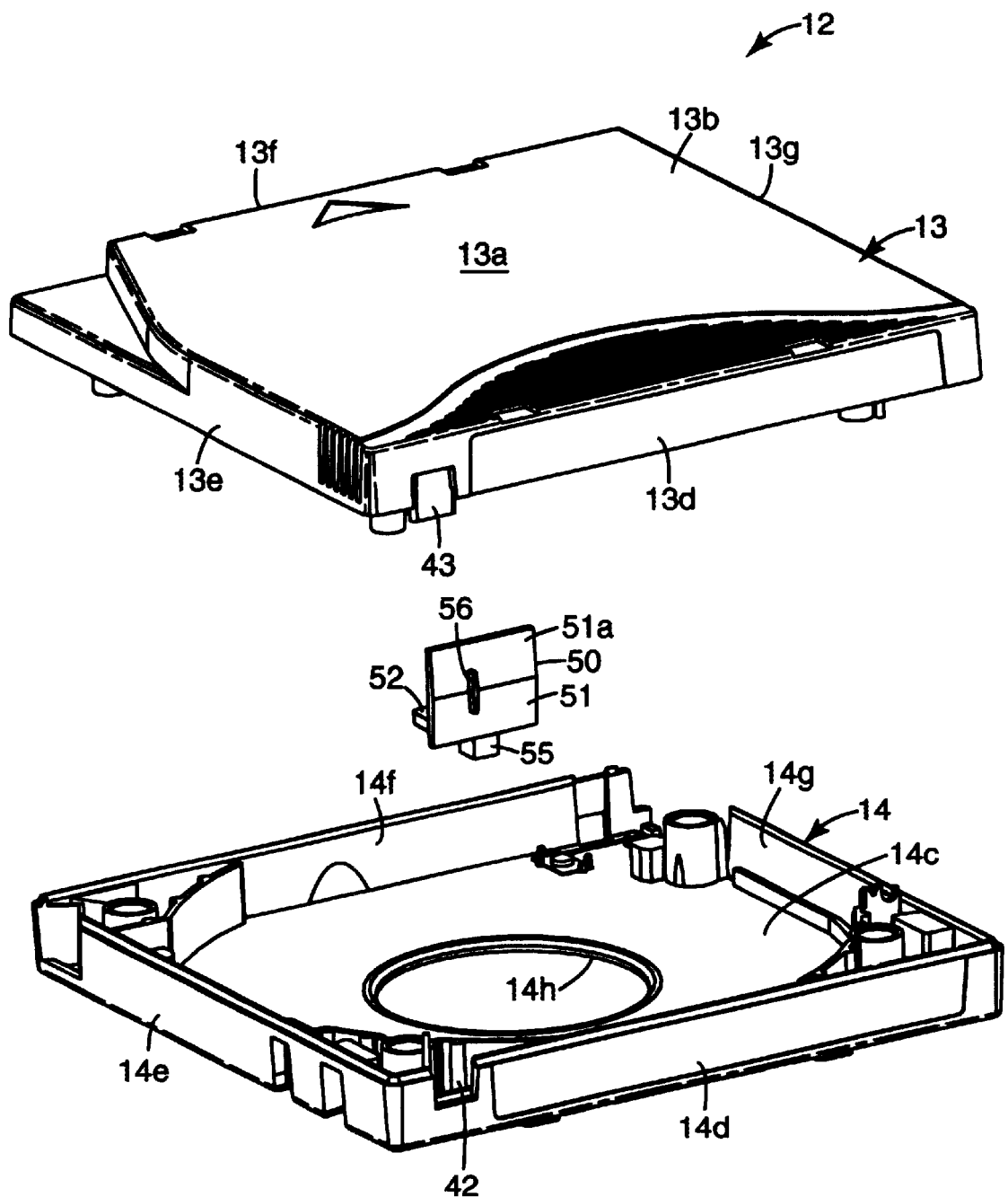
FIG. 2 is an exploded perspective view of the data storage tape cartridge shown in FIG. 1.
Figure 3:
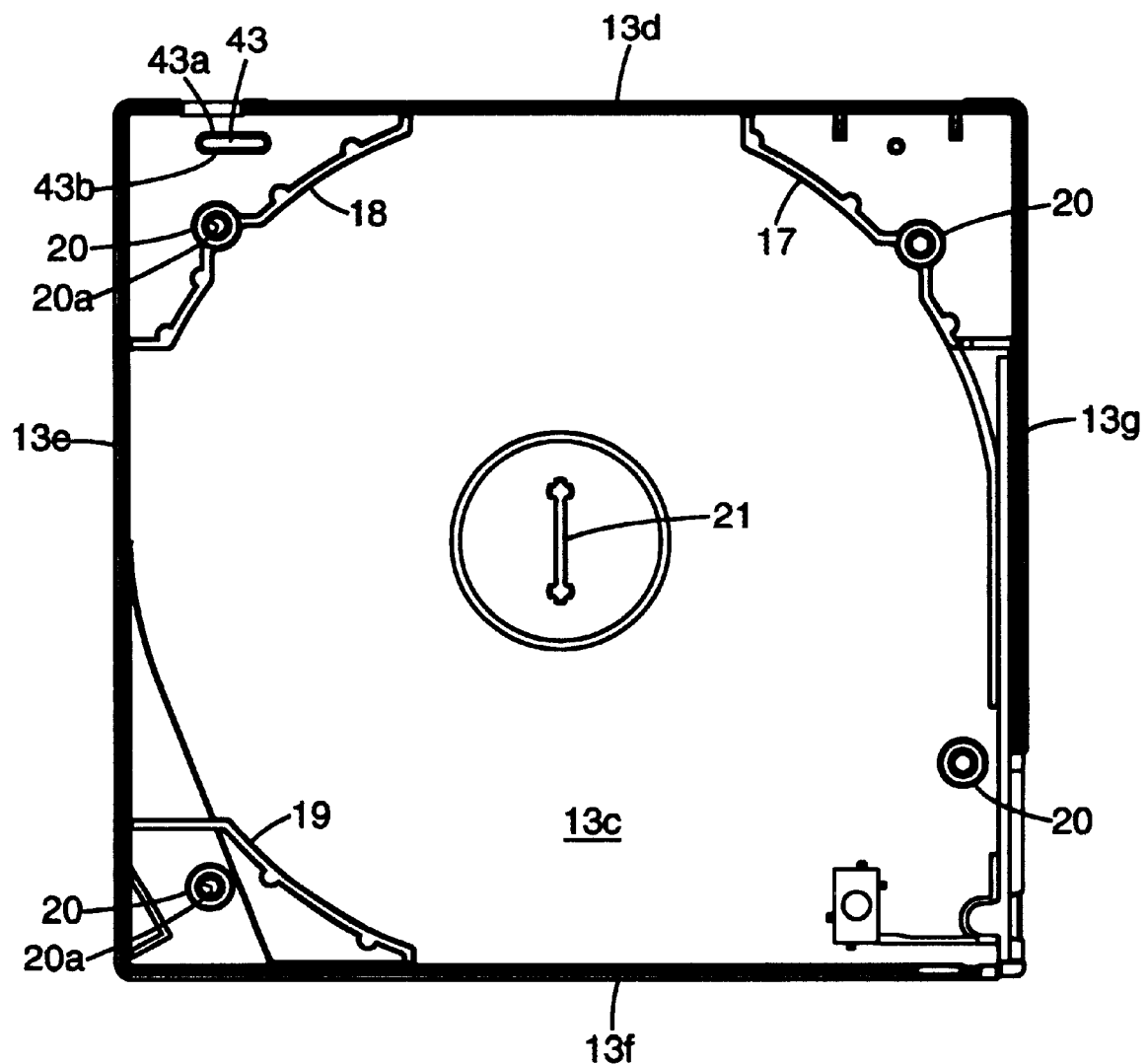
FIG. 3 is an inside plan view of the cover shown in FIG. 2.

Referring to the drawing, wherein like numerals represent like parts throughout the several views, there is generally disclosed at 10 a data storage tape cartridge. Generally speaking, the data storage tape cartridge 10 includes a housing 12 having a first section 13 and a second section 14. A tape reel assembly (not shown) is utilized to house the storage tape. The storage tape is wound around the tape reel assembly.

The housing 12 is preferably sized to receive a typical tape drive (not shown). Thus, the housing 12 may be sized for use within a 5.25 inch (130 millimeter) form factor drive or a 3.5 inch (90 millimeter) form factor drive or other useful sizes. In one preferred embodiment, the first section 13 forms a cover whereas the second section 14 serves as a base. It should be understood that the directional terminology such as "cover", "base", "upper", "lower", "top", "bottom", etc. are used for the purposes of illustration only, and are in no way limiting.

The first section 13 has a planar member 13a that has a top surface 13b and a bottom surface 13c. Four sidewalls 13d–13g depend generally at a 90 degree angle from the planar member 13a. Arcuate inner walls 17–19 are formed which define a cavity for the tape reel assembly. Four cylinders 20 extend from the planar member 13a and have openings 20a at one end. The cylinders are hollow to receive a screw. An elongate brake post 21 extends away from the planar member 13a. The brake post engages a brake button (not shown) which in turn engages the tape reel assembly.

The second section 14 has a planar member 14a which has an outer surface 14b and an inner surface 14c. Four sidewalls 14d–14g depend generally at a 90 degree angle from the planar member 14a. An aperture 14h is formed in the planar member 14a and provides access for a tape drive to the tape reel assembly. There are three arcuate inner walls 97–99 which correspond to arcuate walls 17–19, to form a cavity for the tape reel assembly. Cylindrical posts 22 extend from the planar member 14a and the four cylindrical posts 22 are in alignment with the cylinder 20. The cylindrical posts 22 have an opening 22a at one end and an opening 22b at the other end. The cylinders 20 are sized and configured to fit inside the cylindrical posts 22. Then, when assembled, screws (not shown) are inserted through the openings 22b of the cylinder 22 and tighten to secure the two sections together to form the housing 12. Preferably, the sections 13 and 14 are formed as separate integral moldings from a suitable material such as polycarbonate. The data storage cartridge described thus far is a typical data storage cartridge, the construction of which is well known in the art. It is also understood that the present invention may also be utilized with other data storage cartridges of similar design.

A hand switch opening 30 is formed in the housing 12. Half of the opening 30 is formed in the sidewall 13d and the other half is formed in the sidewall 14d. An interface sensor member opening 40 is formed in the planar member 14a. A switch 50 includes a first plate 51 having a first surface 51a and a second surface 51b. A second plate 52 extends generally perpendicular from the second surface 51b of the first plate 51. The second plate 52 has an outer edge 52a in which a first positioning notch 53 is located as well as a second positioning notch 54. A sensor member 55 extends downward from the second plate 52. The sensor member 55 has a sensor surface 55a with a square cross-section. The opening 40 is in the general shape of a rectangle and is sized to be substantially the same as two of the square sensor surfaces 55a. The switch 50 further includes a handle 56 operatively connected to the first surface 51a of the first plate 51. The switch is preferably molded as a single part from a plastic such as an acetal, which is a polyoxymethylene plastic.

Figure 4:
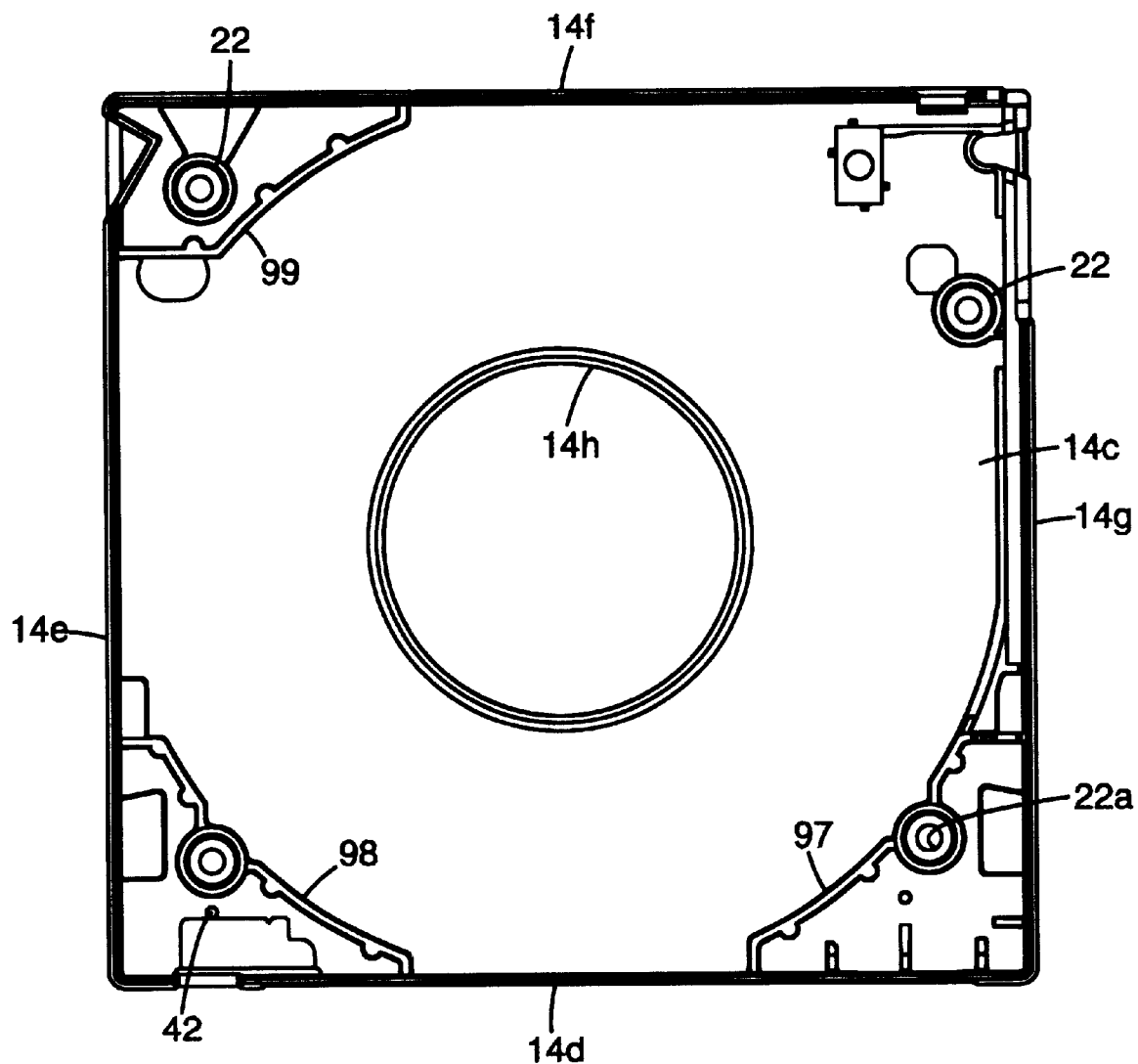
FIG. 4 is an inside plan view of the base, as shown in FIG. 2.
Figure 5:
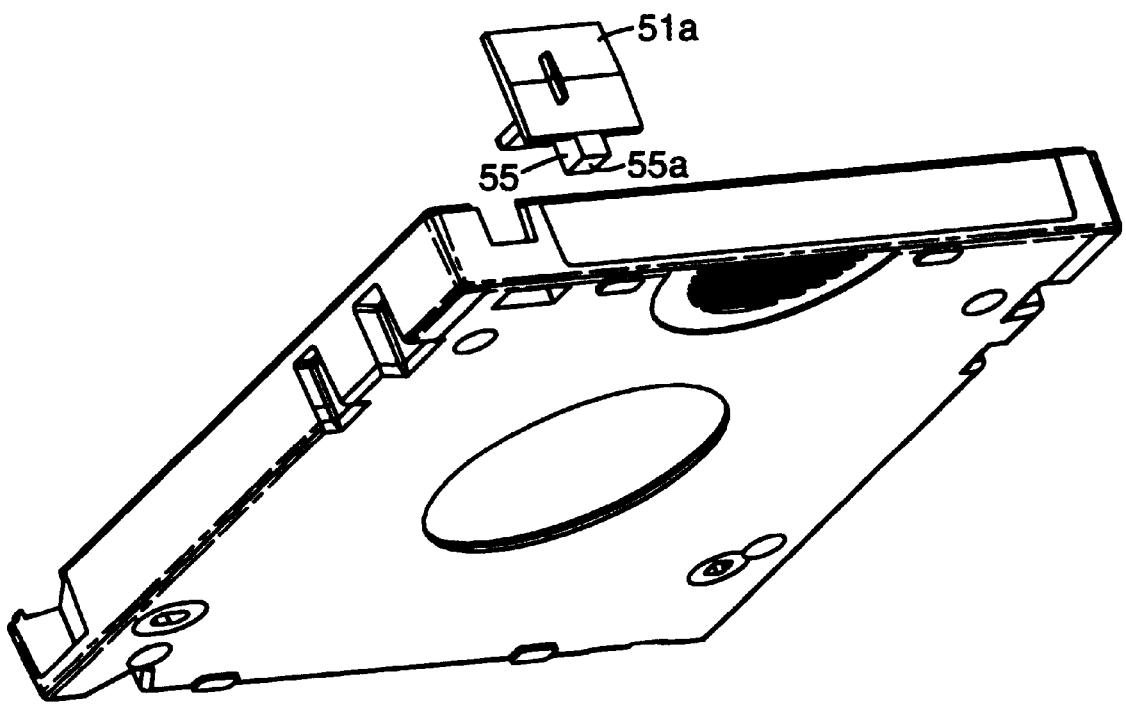
FIG. 5 is an exploded perspective view, viewed from below, of the switch and second section shown in FIG. 1.
Figure 6:
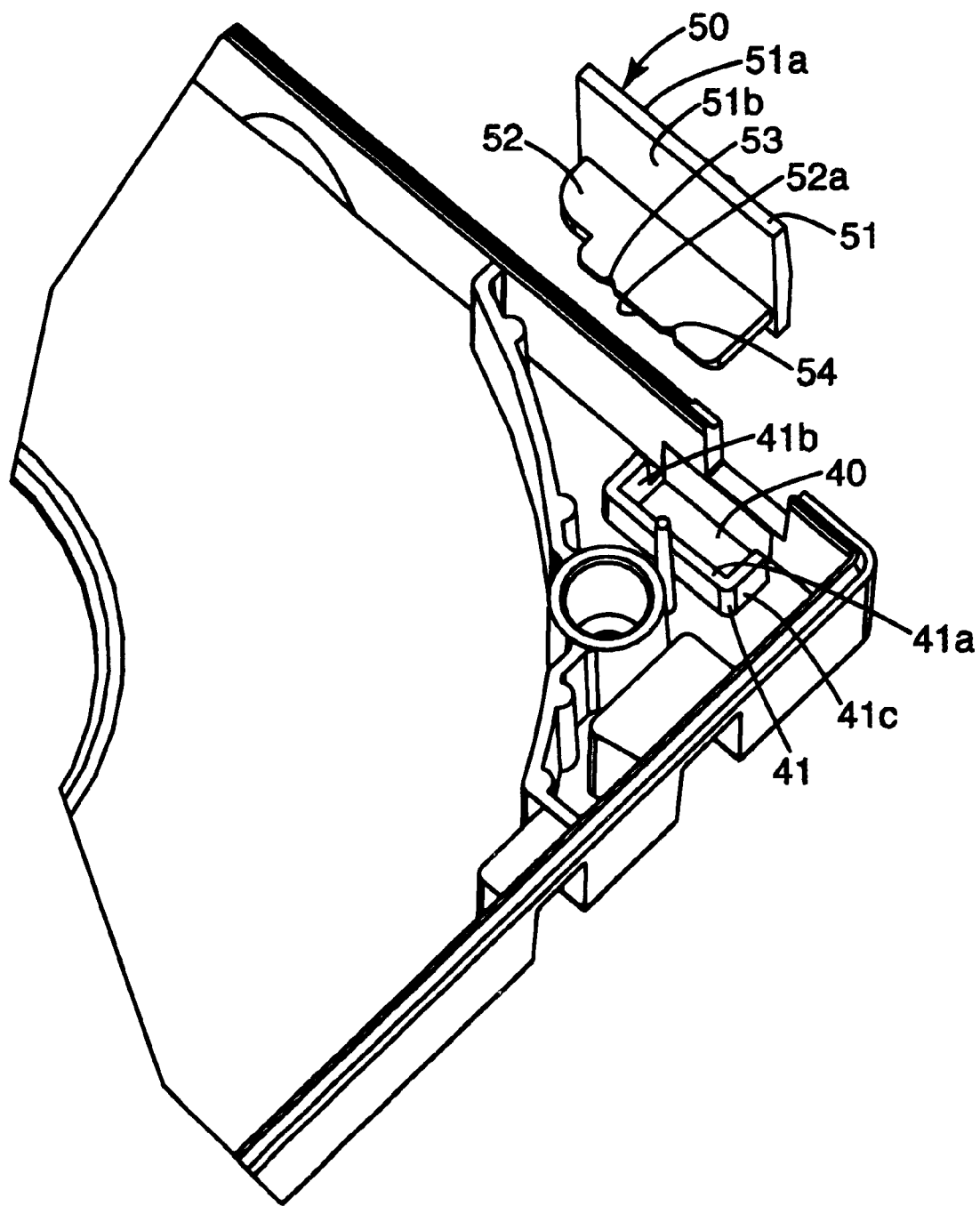
FIG. 6 is a partial exploded perspective view, viewed from inside, of the switch and second section shown in FIG. 1.

A U-shaped retaining member 41 is operatively connected to the surface 14c of the planar member 14. The retaining member 41 has a height (above the surface 14c) which is substantially the same as the distance from the bottom of the second plate 52 to the bottom of the first plate 51. The retaining member 41 includes an elongate member 41a with first and second distal sections 41b and 41c, which are 90 degrees to the elongate member 41b. The retaining member 41 is positioned around the edge of the opening 40, such that the member 41 is an extension of the opening 40. A molded-in spring pin 42 is operatively connected to the surface 14c of the planar member 14a. The pin 42 has a diameter of approximately 1.0 millimeters at its base and 0.9 millimeters at its top. The post 42 extends above the second plate 52 when the second plate 52 is in position. Further, the spring pin 42 is positioned vertically when in the position shown in FIG. 4. That is, when the spring pin 42 is positioned in one of the two notches 53 or 54, the pin 42 is vertical. Then, as the switch 50 is moved by an operator moving the handle 56, the spring pin 42 is deflected as it rides on the outer edge 52a. Then, when it reaches a positioning notch 53 or 54, it springs back to the vertical, thereby providing a positive location for the switch 50.

A hold-down rib 43 extends downward from the surface 13c of the planar member 13a. The hold-down rib 43 has a first planar surface 43a and a second planar surface 43b. The planar surface 43a is positioned such that the planar surface 43a is behind the second surface 51b of the first plate 51, thereby providing support for the switch 50. The second plate 52 of the switch 50 rides on top of the retaining member 41. The sensor member 55 is positioned inside of the retaining member 41 which provides further support and guidance for the switch 50 as it moves between positions.

The present invention provides for a switch that is easy to assemble and there are no other moving parts or springs other than the switch 50 itself. In assembling the data storage cartridge 10, the switch 50 is placed in the second section 14. The sensor member 55 is positioned in the opening 40. This also places the handle 56 in the opening 30. In doing so, the outer edge 52a is proximate the spring pin 42. The handle 56 extends into the opening 30. The handle 56 is substantially flush with the sidewalls 14d and 13d. The sensor surface 55a is also flush with the surface 14b of the planar member 14a. The first section 13 is then placed on top of the second section 14 and secured by screws or other suitable means. In placing the section 13 over the section 14, the retainer or hold-down rib 43 is automatically positioned adjacent the second surface 51b of the first plate, thereby further holding the switch in its proper orientation. The sensor member 55, being positioned in the opening 40 as well as the retaining member 41 further guides the switch 50 as it moves from the first position to the second position. No other parts or springs are needed and an easy assembly is thereby accomplished.

When in the first position, the spring pin 42 contacts the first positioning notch 53. Then, as the switch is moved to the second position, the spring pin 42 deflects backward caused by the outer edge 52a and then springs back into position when the second positioning notch 54 is adjacent the spring pin 42. The spring pin 42 then springs back into the notch 54 and provides for positively locating the switch in the appropriate position. The sensor member 55 has a square cross-section and the opening 40 is rectangular. The opening 40 is sized twice that of the square cross-section of the sensor member 55. The positioning notches 53 and 54 are positioned on the second plate 52 such that the sensor member 55 is at the extreme right or left of the opening 40. The square sensor member cumulatively occupies the entire opening 40 when in both the first and second positions. This provides for a large target for the probe (not shown) which is to contact the sensor surface 55a. If the sensor surface was circular, there would be the necessity of having the probe having a better orientation to make certain that it is in contact with the sensor surface 55a at all times. There is therefore a greater tolerance which is allowed for the probe by having the sensor surface 55a square, rather than circular.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A single reel data storage cartridge, comprising:

a) a housing having a first section having a first planar member and a second section having a second planar member, the sections operatively connected to form the housing, the planar members defining a cover and a bottom, a tape data storage member rotatably positioned in the housing, the tape data storage member consisting essentially of a single reel;

b) the housing defining a first opening and a second opening;

c) a switch having a first plate having a first surface and a second surface, the first surface proximate the housing, wherein the switch has an interface sensor member extending into the second opening;

d) a second plate operatively connected to the first plate and extending away from the first plate;

e) the second plate having a side having first and second positioning members;

f) an elongate spring positioning pin operatively connected to one of the planar members, wherein the switch is slidable between a first position and a second position and the pin interacts with the positioning members to positively locate the switch in position; and g) a retainer operatively connected to the said one of the planar members, the first plate positioned between the retainer and the housing, the second plate extending inward from the retainer, to thereby guide the switch as the switch slides between the first and second positions.

2. The data storage cartridge of claim 1, further comprising a retaining member proximate the second opening, the sensor member positioned in the retaining member to further guide the switch as the switch moves between the first and second positions.

3. The data storage cartridge of claim 2, wherein the retaining member has an elongate first section and two distal sections, the distal sections positioned 90 degress from the elongate first section.

\* \* \* \* \*